US010836327B2

(12) United States Patent
Da Deppo et al.

(10) Patent No.: US 10,836,327 B2
(45) Date of Patent: *Nov. 17, 2020

(54) SENSOR SYSTEM FOR VEHICLE CLOSURE

(71) Applicant: Huf North America Automotive Parts Manufacturing Corp., Milwaukee, WI (US)

(72) Inventors: Lynn D. Da Deppo, Bloomfield Hills, MI (US); Jeffery T. Root, Howell, MI (US); Doug Carson, West Bloomfield, MI (US); David Newkirk, West Bloomfield, MI (US); Ehab Kamal, Novi, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/461,821

(22) PCT Filed: Nov. 17, 2017

(86) PCT No.: PCT/US2017/062210
§ 371 (c)(1),
(2) Date: May 17, 2019

(87) PCT Pub. No.: WO2018/094163
PCT Pub. Date: May 24, 2018

(65) Prior Publication Data
US 2019/0359146 A1 Nov. 28, 2019

Related U.S. Application Data

(60) Provisional application No. 62/424,068, filed on Nov. 18, 2016.

(51) Int. Cl.
*B60R 11/04* (2006.01)
*B60R 11/00* (2006.01)

(52) U.S. Cl.
CPC ....... *B60R 11/04* (2013.01); *B60R 2011/0049* (2013.01); *B60R 2300/10* (2013.01); *B60R 2300/802* (2013.01); *B60R 2300/8093* (2013.01)

(58) Field of Classification Search
None
See application file for complete search history.

(56) References Cited

U.S. PATENT DOCUMENTS 9,889,826 B2 * 2/2018 Periasamy ............. G05G 1/327
10,040,406 B2 * 8/2018 Da Deppo ............. H04N 7/183
(Continued)

FOREIGN PATENT DOCUMENTS

DE 102014018687 A1 6/2016

OTHER PUBLICATIONS

European Patent Office, International Search Report and Written Opinion for International Application No. PCT/US2017/062210, dated Feb. 13, 2018.

*Primary Examiner* — Reza Aghevli
(74) *Attorney, Agent, or Firm* — Honigman LLP; Brandon C. Griffith; Jonathan P. O'Brien

(57) ABSTRACT

An assembly for a vehicle having a closure panel is disclosed. The assembly includes a sensor, a housing supporting the sensor within the closure panel between a first deployed position and a second deployed position, a link rotatably attached to the housing and a plunger coupled to the link. The sensor is operable to sense an area proximate to the closure panel in the first deployed position and in the second deployed position. The plunger is operable to selectively engage a surface of the vehicle to move the housing (Continued)

between the first deployed position and the second deployed position via the link.

25 Claims, 3 Drawing Sheets

(56) References Cited

U.S. PATENT DOCUMENTS

| | | | |
|---|---|---|---|
| 10,348,944 B2* | 7/2019 | Kiehl | H04N 5/2253 |
| 10,538,215 B2* | 1/2020 | Root | B60R 11/04 |
| 2006/0175844 A1* | 8/2006 | Neal | E05B 77/08 |
| | | | 292/340 |
| 2007/0062748 A1* | 3/2007 | Erwin | E05D 11/00 |
| | | | 180/69.21 |
| 2012/0181826 A1* | 7/2012 | Sosnowski | B60N 2/72 |
| | | | 297/217.1 |
| 2015/0135892 A1* | 5/2015 | Vyskocil | G05G 1/40 |
| | | | 74/560 |
| 2015/0183380 A1 | 7/2015 | Da Deppo et al. | |
| 2016/0053517 A1* | 2/2016 | Tomaszewski | E05B 81/72 |
| | | | 200/573 |
| 2018/0251000 A1* | 9/2018 | Norton | B60G 17/01908 |

* cited by examiner

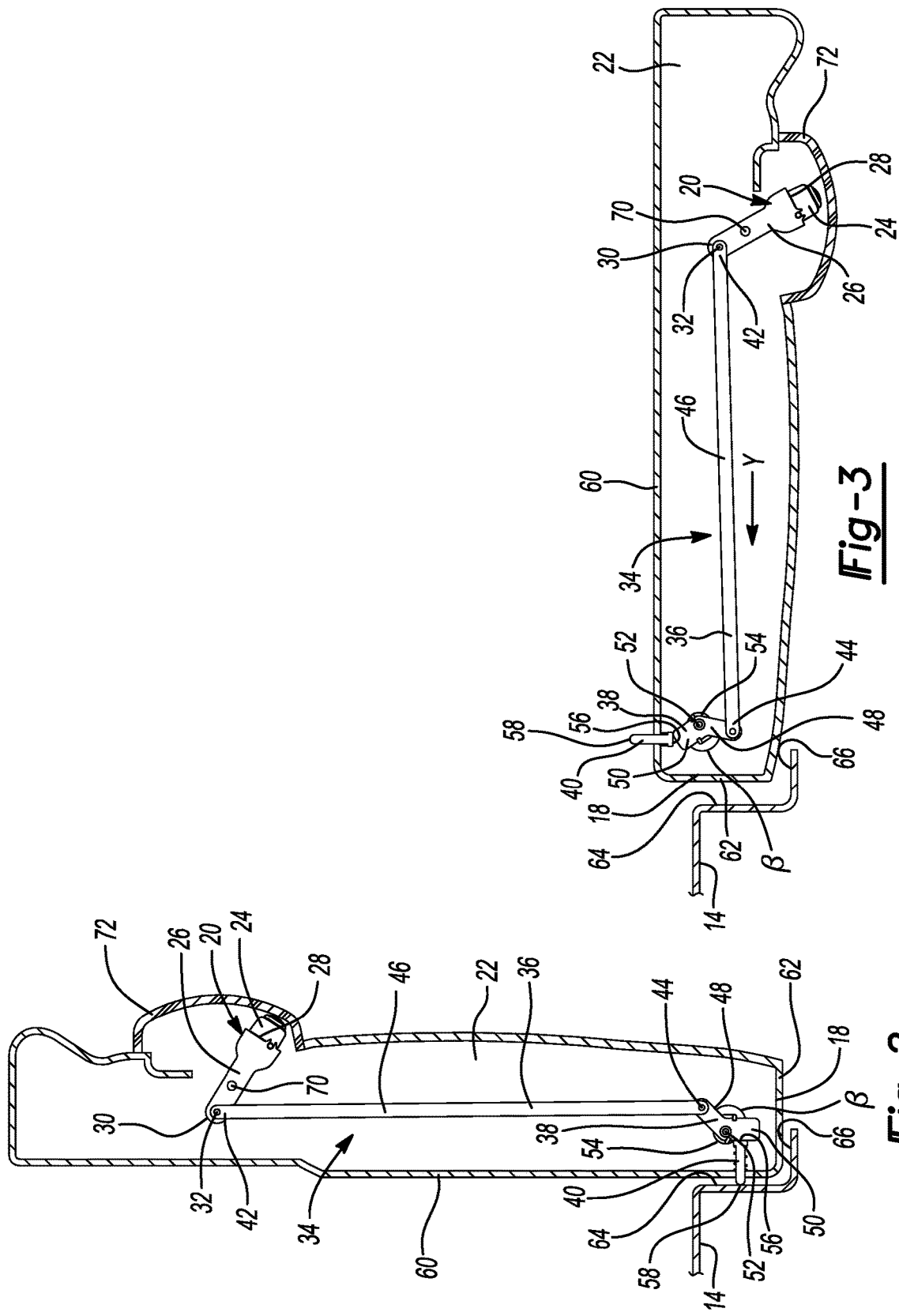

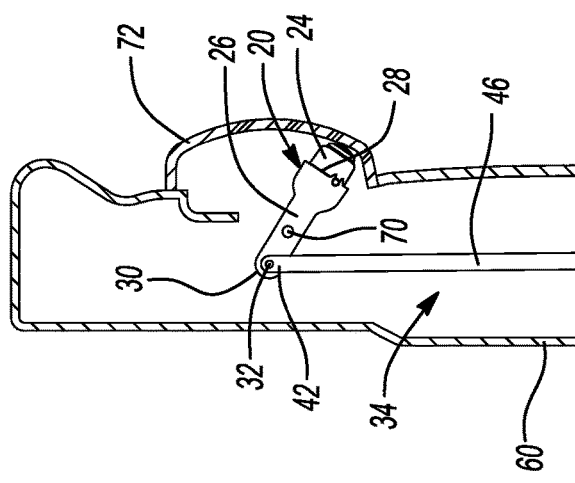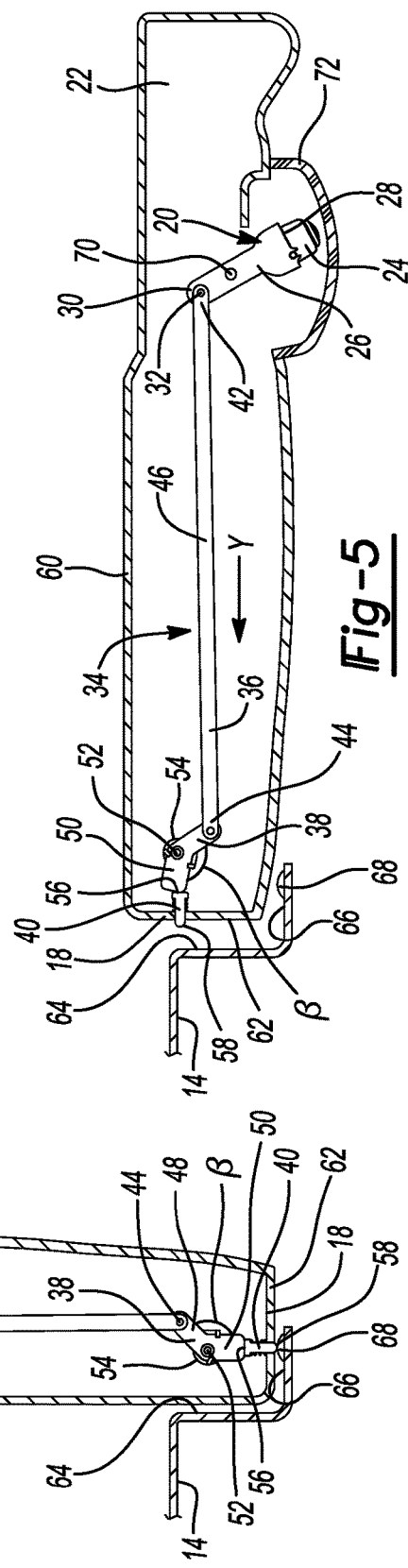

SENSOR SYSTEM FOR VEHICLE CLOSURE

CROSS REFERENCE TO RELATED APPLICATION

This application is the national stage application of International Patent Cooperation Treaty Application No. PCT/US2017/062210, filed Nov. 17, 2017, which claims priority to U.S. Provisional Application Ser. No. 62/424,068, filed Nov. 18, 2016, the contents of which are incorporated herein by reference in their entirety.

FIELD

The present disclosure relates generally to a sensor assembly for a vehicle and more particularly to a deployable sensor assembly for a vehicle closure.

BACKGROUND

This section provides background information related to the present disclosure which is not necessarily prior art.

Many motor vehicles now come equipped with some variation of a camera or sensor system to provide real-time monitoring or viewing of an area near the motor vehicle. For example, cameras, sensors, or both are often positioned on the front of the vehicle or on the rear of the motor vehicle. The cameras and sensors can detect the areas surrounding the vehicle that may or may not be otherwise viewable with conventional mirrors. Such cameras and sensors can be used to assist the vehicle operator in parking or maneuvering the vehicle during normal operation, for example.

To provide a consistent field of view, many camera and sensor systems do not include a cover and are fixedly directed at the space they are intended to monitor. Uncovered cameras and sensors are prone to damage from environmental conditions and exposure, including damage from dirt and stone chipping, and also from human intervention, including theft. To better protect the camera, sensor, or other device, some vehicles utilize a deployable system in which an electric motor, for example, drives the camera between an open or "deployed" position and a closed or "stowed" position.

While conventional deployable systems position a camera or sensor between a deployed position and a stowed position, such systems are not usable in conjunction with a movable closure panel such as a tailgate or liftgate in more than one deployed position. For example, while conventional deployable systems position a camera or sensor in a deployed position for use when the closure panel is in a closed position, use of the camera or sensor to monitor areas surrounding the vehicle when the closure panel is in an open position (i.e., a tailgate of a truck is lowered or a liftgate of a sport utility vehicle (SUV) is in a raised position) is not possible due to the position of the tailgate or liftgate relative to the vehicle.

For example, when the camera or sensor is in the deployed position, the camera or sensor is typically positioned at an angle to view an area behind the vehicle. When the liftgate is moved into the raised position or the tailgate is moved into the lowered position, the camera or sensor remains in the same deployed position relative to the liftgate or tailgate. As such, the camera or sensor views an area above the vehicle in the case of a liftgate or the ground under the tailgate due to the change in position of the liftgate or tailgate relative to the vehicle. Maintaining the relative position of the camera or sensor and the liftgate or tailgate renders the camera or sensor ineffective in viewing an area behind the vehicle should the vehicle be operated with the liftgate in the raised position or the tailgate in the lowered position.

SUMMARY

This section provides a general summary of the disclosure, and is not a comprehensive disclosure of its full scope or all of its features.

One aspect of the disclosure provides an assembly for a vehicle having a closure panel. The assembly includes a sensor, a housing supporting the sensor within the closure panel between a first deployed position and a second deployed position, a link rotatably attached to the housing, and a plunger coupled to the link. The sensor is operable to sense an area proximate to the closure panel in the first deployed position and in the second deployed position. The plunger is operable to selectively engage a surface of the vehicle to move the housing between the first deployed position and the second deployed position via the link.

Implementations of the disclosure may include one or more of the following optional features. In some implementations, the plunger moves the housing between the first deployed position and the second deployed position based on a position of the closure panel relative to the vehicle. The closure panel may be movable relative to the vehicle between a closed position and an open position. The plunger may be operable to move the housing into one of the first deployed position and the second deployed position when the closure panel is in one of the closed position and the open position and operable to move the housing into the other of the first deployed position and the second deployed position when the closure panel is in the other of the closed position and the open position. The sensor may be operable to sense approximately the same field-of-view in the area proximate to the closure panel when the sensor is in the first deployed position and when the sensor is in the second deployed position. In some examples, the closure panel is rotated approximately ninety degrees (90°) relative to the vehicle when rotated between the closed position and the open position. The sensor may be rotated approximately ninety degrees (90°) relative to the closure panel when the sensor is rotated between the first deployed position and the second deployed position.

In some implementations, the link is one of a rod and a cable. The link may be biased in a direction away from the sensor. The assembly may include a biasing member operable to exert a force on the link to bias the link in the direction away from the sensor. The assembly may also include an element disposed between and connecting the plunger and the link. The element may be a bell crank having a first arm in engagement with the plunger and a second arm in engagement with the link. The bell crank may be rotatably supported within the closure panel. The assembly may also include a biasing member operable to bias the bell crank in a first rotational direction.

In some examples, the sensor is one of a proximity sensor and a camera. The sensor may be at approximately the same angle relative to the vehicle when the sensor is in the first deployed position and when the sensor is in the second deployed position. The sensor may be at approximately the same angle relative to the vehicle when the closure panel is in the closed position and when the closure panel is in the open position.

Another aspect of the disclosure provides an assembly for a vehicle having a closure panel. The assembly includes a sensor, a housing supporting the sensor within the closure panel between a first deployed position and a second deployed position, and an actuation assembly. The sensor is operable to sense an area proximate to the closure panel in the first deployed position and in the second deployed position. The actuation assembly may be operable to selectively engage a surface of the vehicle to move the housing between the first deployed position and the second deployed position.

This aspect may include one or more of the following optional features. In some implementations, the actuation assembly moves the housing between the first deployed position and the second deployed position based on a position of the closure panel relative to the vehicle. The closure panel may be movable relative to the vehicle between a closed position and an open position. The actuation assembly may be operable to move the housing into one of the first deployed position and the second deployed position when the closure panel is in one of the closed position and the open position and operable to move the housing into the other of the first deployed position and the second deployed position when the closure panel is in the other of the closed position and the open position.

In some examples, the sensor is operable to sense approximately the same field-of-view in the area proximate to the closure panel when the sensor is in the first deployed position and when the sensor is in the second deployed position. The closure panel may be rotated approximately ninety degrees (90°) relative to the vehicle when rotated between the closed position and the open position. The sensor may be rotated approximately ninety degrees (90°) relative to the closure panel when the sensor is rotated between the first deployed position and the second deployed position. The sensor may be one of a proximity sensor and a camera. The sensor may be at approximately the same angle relative to the vehicle when the sensor is in the first deployed position and when the sensor is in the second deployed position. The sensor may also be at approximately the same angle relative to the vehicle when the closure panel is in the closed position and when the closure panel is in the open position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 2 is cross-sectional view taken along Line 2-2 of FIG. 1 showing the tailgate in an UP position and showing the sensor assembly in a first deployed position;

FIG. 3 is a cross-sectional view of the tailgate of FIG. 1 taken along Line 3-3 showing the tailgate in a DOWN position and the sensor assembly in a second deployed position;

FIG. 4 is a cross-sectional view of the tailgate of FIG. 1 taken along Line 4-4 and showing a sensor assembly in accordance with principals of the present disclosure in a first deployed position; and FIG. 5 is a cross-sectional view of the tailgate of FIG. 1 taken along Line 5-5 showing the tailgate in a DOWN position and the sensor assembly of FIG. 4 in a second deployed position.

Corresponding reference numerals indicate corresponding parts throughout the drawings.

DETAILED DESCRIPTION

Figure 1:
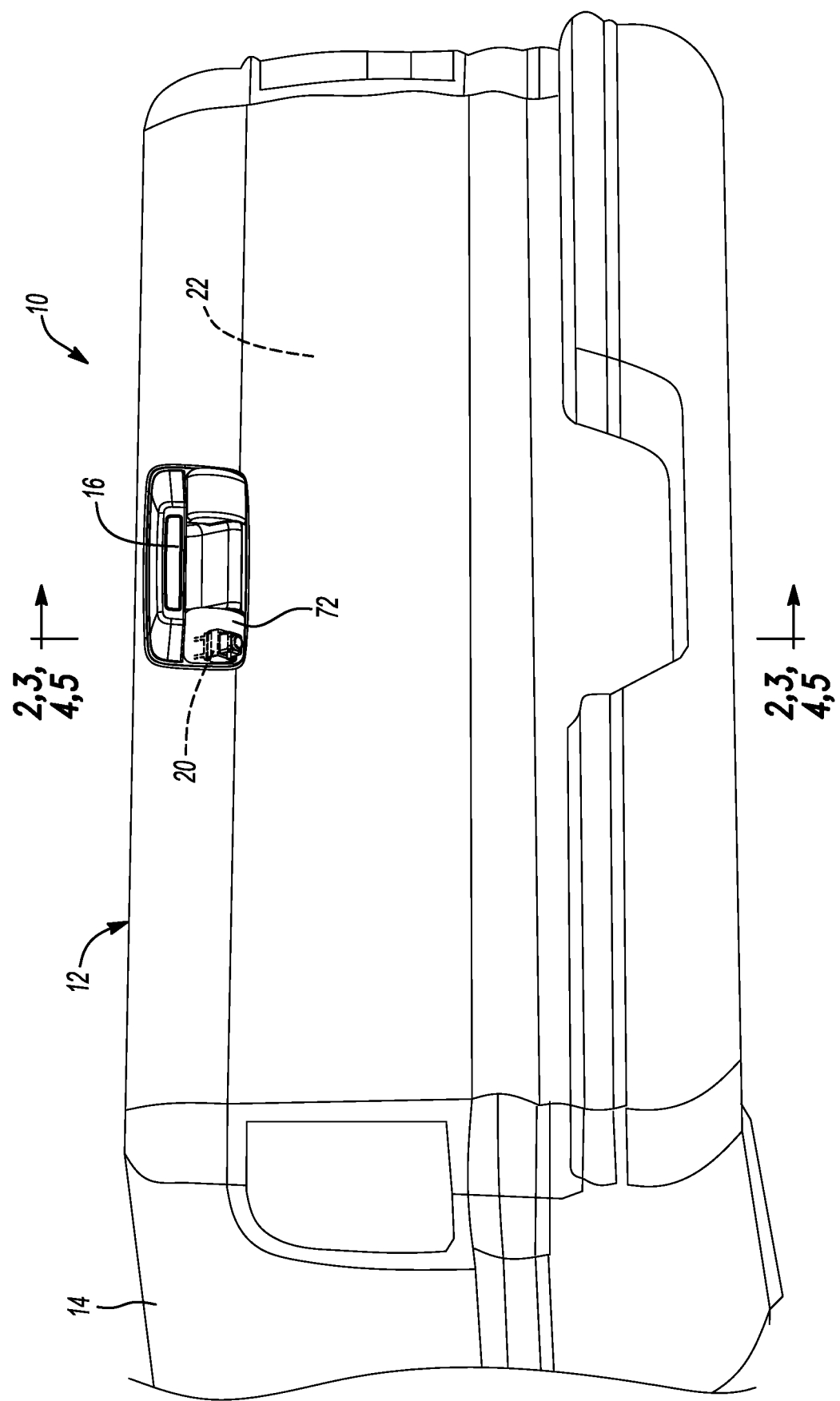
FIG. 1 is a partial rear perspective view of a vehicle including a tailgate having a sensor assembly in accordance with the principals of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

With reference to the figures, a vehicle 10 including a tailgate 12 is provided. The tailgate 12 maybe moveable relative to a body 14 of the vehicle 10 between an UP or closed position (FIG. 1) and a DOWN or open position (FIGS. 3 and 5). When the tailgate 12 is in the UP position, the tailgate 12 may be secured to the body 14 via a latch mechanism (not shown). The tailgate 12 may be moved from the UP position to the DOWN position by moving an actuation handle 16 relative to the tailgate 12. Movement of the actuation handle 16 relative to the tailgate 12 causes the latch mechanism to move from a latched state to an unlatch state, thereby permitting movement of the tailgate 12 from the UP position to the DOWN position.

Movement of the tailgate 12 from the UP position to the DOWN position causes the tailgate 12 to rotate about a lower end 18 of the tailgate 12. Such rotation of the tailgate 12 about the lower end 18 relative to the body 14 causes the tailgate 12 to move from a generally upright state (FIGS. 2 and 4) to a generally horizontal state (FIGS. 3 and 5). In so doing, the tailgate 12 rotates substantially 90 degrees (90°) relative to the body 14.

A sensor assembly 20 may be disposed within a cavity 22 of the tailgate 12 and may be moveable between a first deployed position (FIGS. 2 and 4) and a second deployed position (FIGS. 3 and 5). As will described in greater detail below, movement the sensor assembly 20 between the first deployed position and the second deployed position is based on a position of the tailgate 12 relative to the vehicle 10. While the sensor assembly 20 is shown and described as being used in conjunction with a tailgate 12, the sensor assembly 20 could be used with a different closure panel of a vehicle such as, for example, a liftgate of a sport utility vehicle (SUV).

The sensor assembly 20 may include a sensor 24 and a sensor housing 26. The sensor 24 may be any sensor that is capable of monitoring conditions in an area surrounding the vehicle 10. For example, the sensor 24 may be a camera or a proximity sensor. The sensor 24 may be received and supported by the sensor housing 26 relative to the tailgate 12 at a first end 28 of the sensor housing 26. A second end 30 of the sensor housing 26 may be disposed on an opposite end of the sensor housing 26 then the first end 28 and may include an attachment aperture 32. The attachment aperture 32 may be rotatably coupled to an actuation mechanism 34 that moves the sensor housing 26 and, thus, the sensor 24, relative to the tailgate 12 between the first deployed position and the second deployed position.

The actuation mechanism 34 is disposed within the cavity 22 of the tailgate 12 and includes a link 36, a bell crank 38, and a plunger 40. The link 36 includes a first end 42 rotatably attached to the second end 30 of the sensor housing 26, a second end 44 rotatably attached to the bell crank 38, and a main body 46 extending between the first end 42 and the second end 44. As shown in the drawings, the main body 46 may be an elongate rod and may be formed from a metal material such as, for example, steel. While the main body 46 is described and shown as being an elongate rod, the main body 46 could alternatively be formed from a length of cable extending between the sensor housing 26 and the bell crank 38.

The bell crank 38 is rotatably attached to the second end 44 of the link 36 and includes a first leg 48 and a second leg 50. The first leg 48 is rotatably attached to the second end 44 of the link 36 and the second leg 50 extends from the first leg 48 for interaction with the plunger 40, as will be described in greater detail below. As shown in FIGS. 2-5, the second leg 50 extends from the first leg 48 at an angle (β). Positioning the first leg 48 at an angle (β) relative to the second leg 50 allows the bell crank 38 to change the direction of a force applied at the second leg 50 which, in turn, allows the bell crank 38 to cause the link 36 to translate relative to the tailgate 12 within the cavity 22 during operation of the actuation mechanisms 34.

As shown in FIGS. 2-5, the first leg 48 and the second leg 50 rotate about a common fulcrum 52 at a junction of the first leg 48 and the second leg 50. Accordingly, when the bell crank 38 is rotated relative to and within the tailgate 12, the first leg 48 and the second leg 50 rotate about the fulcrum 52. A biasing member 54 maybe located at the fulcrum 52 to apply a biasing force on the bell crank 38. In one configuration, the biasing member 54 is a coil spring that biases the bell crank 38 in the clockwise direction (CW) relative to the views shown in FIGS. 2 and 4. Accordingly, the bell crank 38 biases the link 38 in a direction (Y), as shown in FIGS. 3 and 5.

The plunger 40 includes an engagement surface 56 and a contact surface 58 disposed on an opposite end the plunger 40 than the engagement surface 56. As shown in FIGS. 2-5, the engagement surface 56 is in contact with the second leg 50 of the bell crank 38 while the contact surface 58 is in selective engagement with the body 14 of the vehicle 10.

In one configuration, the plunger 40 extends from a rear panel 60 of the tailgate 12. As such, the contact surface 58 is exposed at the rear panel 60 of the tailgate 12 when the tailgate 12 is in the DOWN position. In another configuration, the plunger 40 extends from a bottom surface 62 of the tailgate 12 when the tailgate 12 is in the DOWN position. As shown in FIGS. 2-5, the rear panel 60 is at a substantially ninety degree angle (90°) relative to the bottom surface 62.

With particular reference to FIGS. 2-5, operation of the sensor assembly 20 and actuation mechanism 34 will be described in detail. When the tailgate 12 is in the UP position (FIGS. 2 and 4), the plunger 40 extends from the rear panel 60 (FIG. 2) or from the bottom surface (62) of the tailgate 12 depending on the particular configuration of the actuation mechanism 34. If the actuation mechanism 34 is configured such that the plunger 40 extends from the tailgate 12 at the rear panel 60, the contact surface 58 engages a first surface 64 of the body 14 when the tailgate is in the UP position. Similarly, if the actuation mechanism 34 is configured such that the plunger 40 extends from the tailgate 12 at the bottom surface 62, the contact surface 58 of the plunger 40 engages a second surface 66 of the body 14. Specifically, the contact surface 58 may engage a ramp or cam surface 68 associated with the second surface 66.

Engagement between the contact surface 58 of the plunger 40 and one of the first surface 64 and the second surface 66 of the body 14 causes the plunger 40 to move into the cavity 22, thereby causing the engagement surface 56 of the plunger 40 to exert force on the second leg 50 of the bell crank 38. The force exerted on the second leg 50 by the plunger 40 causes the bell crank 38 to rotate in the counterclockwise (CCW) direction relative to the views shown in FIGS. 2-5. Rotation of the bell crank 38 in the counterclockwise (CCW) direction causes the first leg 48 of the bell crank 38 to move in a direction toward the bottom surface 62 of the tailgate 12. In so doing, a force is applied on the Link 36 due to the rotatable attachment of the leg 48 of the bell crank 38 and the second end 44 of the Link 36. The applied force causes the Link 36 to move in a direction (Y) and toward the bottom surface 62 of the tailgate 12.

Movement of the Link 36 in direction (Y) and toward the bottom surface 62 of the tailgate 12 applies a rotational force on the sensor housing 26 at the second end 30 of the sensor housing 26. Namely, because the sensor housing 26 is rotatably attached relative to the tailgate 12 at a pivot 70, the force applied on the sensor housing 26 via the link 36 causes the sensor housing 26 to rotate about the pivot 70 and in the counterclockwise direction (CCW) relative to the views shown in FIGS. 2-5.

As shown in FIGS. 2-5, rotation of the sensor housing 26 and, thus, the sensor 24 in the counterclockwise direction (CCW), causes the sensor 24 to be moved relative to the tailgate 12. As such, the sensor 24 is permitted to maintain a desired field-of-view when the tailgate 12 is moved from the UP position to the DOWN position. For example, when the tailgate 12 is in the UP position, the sensor housing 26 and, thus, the sensor 24 are positioned relative to a cover 72 associated with the tailgate 12 such the sensor 24 is permitted to sense an area generally behind the vehicle 10. In this position, the sensor 24 is located proximate to a bottom of the cover 72, as shown in FIG. 2. When the tailgate 12 is moved from the UP position to the DOWN position, the sensor housing 26 and, thus, the sensor 24 are rotated away from the bottom of the cover 72 and toward a top portion of the cover 72, as shown in FIG. 3, to permit the sensor 24 to maintain a view of an area behind the vehicle 10 even though the tailgate 12 is in the DOWN position.

Movement of the sensor housing 26 and the sensor 24 toward the top of the cover 72 happens automatically when the tailgate 12 is sufficiently rotated relative to the body 14 and toward the DOWN position. Namely, when the tailgate 12 is rotated a predetermined distance from the UP position toward the DOWN position, the plunger 40 may disengage the body 14 at one of surfaces 64, 66 depending on the particular configuration of the actuation mechanism 34. Once the plunger 40 extends relative to the body 14, the biasing member 54 is permitted to exert a force on and rotate the bell crank 38 relative to the tailgate 12. In so doing, the plunger 40 extends from the tailgate 12, as shown in FIGS. 3 and 5, and the sensor housing 26 and the sensor 24 are rotated via the link 36 in a direction toward the top portion of the cover 72.

When the tailgate is returned to the UP position from the DOWN position, the contact surface 58 of the plunger 40 contacts one of the first surface 64 and the second surface 66 of the body 14 depending on the particular configuration of the actuation mechanism 34. Engagement between the contact surface 58 and one of the first surface 64 and the second surface 66 causes the plunger 40 to impart a rotational force on the bell crank 38 against the biasing member 54, thereby causing the plunger 40 to move into the cavity 22. Movement of plunger 40 into the cavity 22 causes the bell crank 38 to rotate in the counterclockwise direction (CCW) relative to the view shown in FIGS. 2-5, thereby causing the link 36 to move in a direction opposite to direction (Y). Movement of the Link (36) in the direction opposite direction (Y) causes the sensor housing 26 and, thus, the sensor 24, to rotate in the clockwise direction (CW) and toward the bottom portion of the cover 72, as shown in FIGS. 2 and 4. Sufficient rotation of the sensor 24 in the clockwise direction (CW) allows the sensor 24 to sense an area behind the vehicle (10) when the tailgate 12 is returned to the UP position.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An assembly for a vehicle having a closure panel, the assembly comprising:
   a sensor;
   a housing supporting the sensor within the closure panel between a first deployed position and a second deployed position, the sensor operable to sense an area proximate to the closure panel in the first deployed position and in the second deployed position;
   a link rotatably attached to the housing; and
   a plunger coupled to the link and operable to selectively engage a surface of the vehicle to move the housing between the first deployed position and the second deployed position via the link.

2. The assembly of claim 1, wherein the plunger moves the housing between the first deployed position and the second deployed position based on a position of the closure panel relative to the vehicle.

3. The assembly of claim 1, wherein the closure panel is movable relative to the vehicle between a closed position and an open position, the plunger operable to move the housing into one of the first deployed position and the second deployed position when the closure panel is in one of the closed position and the open position and operable to move the housing into the other of the first deployed position and the second deployed position when the closure panel is in the other of the closed position and the open position.

4. The assembly of claim 3, wherein the sensor is operable to sense approximately the same field-of-view in the area proximate to the closure panel when the sensor is in the first deployed position and when the sensor is in the second deployed position.

5. The assembly of claim 3, wherein the closure panel is rotated approximately ninety degrees (90°) relative to the vehicle when rotated between the closed position and the open position.

6. The assembly of claim 5, wherein the sensor is rotated approximately ninety degrees (90°) relative to the closure panel when the sensor is rotated between the first deployed position and the second deployed position.

7. The assembly of claim 1, wherein the link is one of a rod and a cable.

8. The assembly of claim 1, wherein the link is biased in a direction away from the sensor.

9. The assembly of claim 8, further comprising a biasing member operable to exert a force on the link to bias the link in the direction away from the sensor.

10. The assembly of claim 1, further comprising an element disposed between and connecting the plunger and the link.

11. The assembly of claim 10, wherein the element is a bell crank having a first arm in engagement with the plunger and a second arm in engagement with the link.

12. The assembly of claim 11, wherein the bell crank is rotatably supported within the closure panel.

13. The assembly of claim 12, further comprising a biasing member operable to bias the bell crank in a first rotational direction.

14. The assembly of claim 1, wherein the sensor is one of a proximity sensor and a camera.

15. The assembly of claim 1, wherein the sensor is at approximately the same angle relative to the vehicle when the sensor is in the first deployed position and when the sensor is in the second deployed position.

16. The assembly of claim 1, wherein the sensor is at approximately the same angle relative to the vehicle when the closure panel is in a closed position and when the closure panel is in an open position.

17. An assembly for a vehicle having a closure panel, the assembly comprising:
- a sensor;
- a housing supporting the sensor within the closure panel between a first deployed position and a second deployed position, the sensor operable to sense an area proximate to the closure panel in the first deployed position and in the second deployed position; and
- an actuation assembly operable to selectively engage a surface of the vehicle to move the housing between the first deployed position and the second deployed position.

18. The assembly of claim 17, wherein the actuation assembly moves the housing between the first deployed position and the second deployed position based on a position of the closure panel relative to the vehicle.

19. The assembly of claim 17, wherein the closure panel is movable relative to the vehicle between a closed position and an open position, the actuation assembly operable to move the housing into one of the first deployed position and the second deployed position when the closure panel is in one of the closed position and the open position and operable to move the housing into the other of the first deployed position and the second deployed position when the closure panel is in the other of the closed position and the open position.

20. The assembly of claim 19, wherein the sensor is operable to sense approximately the same field-of-view in the area proximate to the closure panel when the sensor is in the first deployed position and when the sensor is in the second deployed position.

21. The assembly of claim 19, wherein the closure panel is rotated approximately ninety degrees (90°) relative to the vehicle when rotated between the closed position and the open position.

22. The assembly of claim 21, wherein the sensor is rotated approximately ninety degrees (90°) relative to the closure panel when the sensor is rotated between the first deployed position and the second deployed position.

23. The assembly of claim 17, wherein the sensor is one of a proximity sensor and a camera.

24. The assembly of claim 17, wherein the sensor is at approximately the same angle relative to the vehicle when the sensor is in the first deployed position and when the sensor is in the second deployed position.

25. The assembly of claim 17, wherein the sensor is at approximately the same angle relative to the vehicle when the closure panel is in a closed position and when the closure panel is in an open position.

* * * * *